(12) United States Patent
Gomez Marquez

(10) Patent No.: US 11,312,443 B2
(45) Date of Patent: Apr. 26, 2022

(54) CHASSIS FOR ELECTRIC CARGO VEHICLES AND ELECTRIC VEHICLE COMPRISING SAID CHASSIS

(71) Applicant: PASSION MOTORBIKE FACTORY, S.L., Dos Hermanas-Sevilla (ES)

(72) Inventor: Jose Maria Gomez Marquez, Dos Hermanas-Sevilla (ES)

(73) Assignee: PASSION MOTORBIKE FACTORY, S.L., Dos Hermanas-Sevilla (ES)

( * ) Notice: Subject to any disclaimer, the term of this patent is extended or adjusted under 35 U.S.C. 154(b) by 19 days.

(21) Appl. No.: 17/042,561

(22) PCT Filed: Mar. 27, 2019

(86) PCT No.: PCT/ES2019/070204
§ 371 (c)(1),
(2) Date: Sep. 28, 2020

(87) PCT Pub. No.: WO2019/185964
PCT Pub. Date: Oct. 3, 2019

(65) Prior Publication Data
US 2021/0031860 A1 Feb. 4, 2021

(30) Foreign Application Priority Data
Mar. 28, 2018 (ES) .................. P201830313

(51) Int. Cl.
*B62K 7/04* (2006.01)
*B62J 45/20* (2020.01)
(Continued)

(52) U.S. Cl.
CPC ................. *B62K 7/04* (2013.01); *B62J 43/20* (2020.02); *B62J 45/20* (2020.02); *B62K 5/05* (2013.01);
(Continued)

(58) Field of Classification Search
CPC ... B62K 7/04; B62K 5/05; B62K 5/10; B62K 21/12; B62K 25/005; B62K 2005/001;
(Continued)

(56) References Cited

U.S. PATENT DOCUMENTS 9,770,825 B2 * 9/2017 Goldenberg ........... B62D 55/26
10,377,401 B2 * 8/2019 Thibault .................. B62B 3/02
(Continued)

FOREIGN PATENT DOCUMENTS

CN     202923798 U    5/2013
CN     203063708 U    7/2013
(Continued)

*Primary Examiner* — Darlene P Condra
(74) *Attorney, Agent, or Firm* — Hayes Soloway P.C.

(57) ABSTRACT

The invention relates to a chassis, suitable for use in electric vehicles, characterized in that it comprises: a substantially planar loading bed, suitable for receiving a load on top of same, which is located between at least two front wheels and at least one rear wheel of an electric vehicle; wherein said loading bed comprises a channel the chassis also comprises a central shaft housed in said channel; wherein the loading bed is connected so as to pivot relative to said central shaft; wherein the loading bed comprises a plurality of battery housings distributed symmetrically; and the chassis comprises a rear traction and steering assembly and a front suspension and inclination assembly. The invention likewise relates to an electric vehicle comprising said chassis.

12 Claims, 3 Drawing Sheets

(51) Int. Cl.
  *B62J 43/20* (2020.01)
  *B62K 5/05* (2013.01)
  *B62K 5/10* (2013.01)
  *B62K 21/12* (2006.01)
  *B62K 25/00* (2006.01)
  *B62K 5/00* (2013.01)

(52) U.S. Cl.
  CPC ............... *B62K 5/10* (2013.01); *B62K 21/12* (2013.01); *B62K 25/005* (2013.01); *B62K 2005/001* (2013.01)

(58) Field of Classification Search
  CPC ...... B62K 5/027; B62K 5/06; B62K 2204/00; B62K 21/18; B62J 43/20; B62J 45/20; B62J 43/28; B62J 43/16; B60G 2300/122; B60G 2200/1322; B60G 2204/82; B60G 2204/8302; B60G 3/14; B60G 3/20; B60G 2200/144; B60G 2300/45; B60G 2300/50; B60G 21/05; B60L 50/66; B60L 2200/22; B60L 2200/36; B60L 50/50; Y02T 10/70
  See application file for complete search history.

(56) References Cited

U.S. PATENT DOCUMENTS 10,908,045 B2 * 2/2021 Coulter ............... B60W 30/143
2019/0046373 A1 * 2/2019 Coulter ................. A61G 5/063

FOREIGN PATENT DOCUMENTS

| CN | 103587618 A | 2/2014 |
| CN | 205769846 U | 12/2016 |
| CN | 106585831 A | 4/2017 |
| ES | WO 2021186092 A2 * | 3/2021 |

* cited by examiner

US 11,312,443 B2

CHASSIS FOR ELECTRIC CARGO VEHICLES AND ELECTRIC VEHICLE COMPRISING SAID CHASSIS

CROSS-REFERENCE TO RELATED APPLICATIONS AND PRIORITY

This patent application claims priority from PCT Patent Application No. PCT/ES2019/070204 filed Mar. 27, 2019, which claims priority from Spanish Patent Application No. ESP201830313 filed Mar. 28, 2018. Each of these patent applications are herein incorporated by reference in its/their entirety.

FIELD OF THE INVENTION

The present invention is comprised within the technical field corresponding to the sector of the technologies related to electric vehicles having three or more wheels, preferably single-seat vehicles, primarily intended for cargo. More specifically, the invention relates, although without limitation to vehicles of another type, to the development of an moped-type electric vehicle comprising a planar chassis, with a characteristic distribution of its elements which allows the cargo to be housed in the central part of the vehicle on top of the chassis, and further comprising a suspension and inclination assembly and a traction and steering assembly, suitable for improving the stability of the vehicle, its maneuverability, and driving safety.

BACKGROUND OF THE INVENTION

Within the technical field of lightweight electric motor vehicles intended for cargo and/or people, there are two main product lines: licensed vehicles that can be driven in the city or on roads, and vehicles confined to enclosed spaces (non-licensed) such as industrial buildings, warehouses, construction works, etc.

Among vehicles intended for cargos in enclosed spaces, industrial buildings, or warehouses, pallet jack or fenwick-type vehicles are usually used, which are capable of transporting and even lifting large loads, but move slowly and in a somewhat limited manner, with the driver usually standing, supported on the vehicle, operating a steering wheel or controls. Vehicles capable of covering internal cargo movement needs in a more flexible and faster manner in these enclosed spaces are still needed today.

In turn, among licensed lightweight electric vehicles that can be driven in the city or on roads, the following are primarily found:

Licensed electric vehicles, such as motorcycles and other lightweight vehicles intended for transporting goods: they are usually very narrow vehicles which, due to their dimensions and the need for homologation such as an L5E-type motorcycle, can access and park in areas intended for motorcycles, without causing holdups or jams, and have access to narrow streets and more inaccessible areas for delivery vans, etc.

Said vehicles typically comprise two or three wheels and the cargo they carry is usually positioned in a trunk housed either in the front part or in the rear part of the vehicle. On other occasions, the cargo is housed on the sides of the vehicle by way of saddlebags. In all these cases, the driver of the vehicle is positioned in the central area of the vehicle, on top of the chassis; that is, the main cargo is always distributed at the ends of the vehicle and of the main axis, and if the cargo is very heavy, this has a negative influence on the stability and manageability thereof. Additionally, carrying the cargo in a trunk at the end partially limits both the cargo in kilos that can be transported and its total volume, since the volume of the cargo is also a reason for instability, as the center of gravity shifts to the end.

Lastly, in the case of motorcycle-type electric vehicles having two wheels, when making a turn, and to compensate for the acting centrifugal force when taking the curve, the vehicle must be inclined slightly towards the center of the curve. This inclination means that the cargo is also inclined along with motorcycle and may cause it to accidentally fall. Although this problem is common in all motorcycle- and moped-type vehicles, it is particularly important in the case of electric motorcycles, given that their weight is usually distributed worse than in motor vehicles, given the design requirements and demands of existing batteries.

Vehicles intended for public services, such as urban cleaning, garbage collection, maintenance, etc.: they are usually vehicles having four wheels such as vans or light trucks which are either too wide or too slow and heavy and have mobility difficulties. In this field, there is a need to provide vehicles that can carry a large box (euro-pallet) that can be customized to its technical needs, a cargo capacity in the order of 750 kg, and especially dimensions (about 90 cm wide at most) and a flexibility that allows them to more efficiently provide services in hard-to-access areas and streets.

In the cases described in detail above, the need to provide homologated vehicles that are lightweight and not too large so as to enable being introduced in narrow streets and parked in areas intended for motorcycles, but at the same time capable of carrying a large cargo (750 kg) or considerable volume (200 l) safely and with superb driving manageability is therefore considered.

These needs, and particularly those referring to parking and delivery, correspond to the commonly known "last mile" problem in logistics. This is the time that lapses from when a package leaves the last distribution point until it reaches the delivery location; it is the last and the most fundamental step of the entire distribution chain. This step involves problems such as for example: mobility in urban areas; delivery inefficiency in the case of small packages; the required short span of time to meet delivery deadlines; higher environmental impact ($CO_2$ emissions), etc.

With the limitations described in the preceding paragraphs, it is necessary in the present technical field to have clean, lightweight vehicles with good manageability and driving safety, small dimensions, easy to park, homologated, and at the same time capable of transporting considerable volumes and cargo, furthermore adapting to specific mobility needs according to the function carried out in the specific vehicle.

For this purpose, the present invention proposes a novel planar chassis conceived to be implemented in a an electric vehicle for mixed use or for cargo, wherein said cargo is housed on top of the chassis, and further comprising a traction and steering assembly and a suspension and inclination assembly, the technical embodiment of which allows the problems described in detail above to be overcome with one and the same vehicle.

BRIEF DESCRIPTION OF THE INVENTION

An object of the present invention relates, although without limitation, to the development of a chassis, suitable for use in electric vehicles having at least three wheels intended for cargo and/or people. Advantageously, said chassis comprises: a substantially planar loading bed, suitable for receiving a load on top of same, which is located substantially in the space existing between at least two front wheels and at least one rear wheel of an electric vehicle.

Said loading bed comprises a housing channel located substantially along said loading bed. The chassis also comprises a central shaft housed in said housing channel; the loading bed is connected so as to pivot relative to said central shaft. The loading bed comprises a plurality of battery housings, being distributed in a manner substantially symmetrical to both sides along the central shaft.

The chassis further comprises a rear traction and steering assembly and a front suspension and inclination assembly; being both assemblies connected through the central shaft and wherein the rear traction and steering assembly and the front suspension and inclination assembly respectively comprise connections to the at least one rear wheel and to the at least two front wheels.

Providing chassis for electric vehicles having three wheels which allow cargo to be housed in the central area of the vehicle, thus increasing the cargo capacity through the distribution of elements, in which the driver is not positioned in the central part of the vehicle but rather the heaviest cargo is, is thereby achieved. The center of gravity being shifted to the lower area of the vehicle as the batteries are positioned in a manner symmetrical to both sides of the central shaft of the chassis, since they have a considerable weight, is further achieved. Therefore, even when the cargo on top of the loading bed is distributed asymmetrically relative to the central shaft, this does not affect the stability of the vehicle as much as in a conventional motorcycle for urban distribution. Furthermore with the free pivoting of the loading bed, said loading bed and the cargo are kept horizontal at all times.

In a preferred embodiment of the invention, the loading bed comprises extraction rails, configured for the extraction of a cargo box housed on the loading bed. Preferably, the extraction rails are located in a manner that is substantially horizontal and perpendicular to the central shaft, configured for the extraction of the cargo box from the side of the loading bed. More preferably, the cargo box has elements for anchoring to the loading bed which can be disconnected, for fixing and releasing the position of the cargo box relative to the loading bed. Even more preferably, the extraction rails have hydraulic or mechanical means for facilitating the extraction of the cargo box.

Providing a fast and comfortable way to remove the cargo from the vehicle when it is parked for urban delivery, especially if the cargo is very heavy or bulky, from the side of the vehicle, without having to lift the cargo box in its entirety, as occurs with rear trunks in conventional motorcycles, is thereby achieved.

In a preferred embodiment of the invention, the chassis comprises a front support of the loading bed and a rear opening of the loading bed; wherein the rear traction and steering assembly and the front suspension and inclination assembly are arranged respectively and partially in the rear opening and in the front support of the loading bed.

Preferably, the front suspension and inclination assembly comprises a stiffening bridge, connecting journals, upper suspension wishbones and lower anchoring wishbones; wherein:

the stiffening bridge is integrally attached to the central shaft and is partially arranged in the front support of the loading bed;

the front support of the loading bed pivots freely around the central shaft;

the stiffening bridge is connected through a pivoting connection to the upper suspension wishbones;

the upper suspension wishbones are connected through a pivoting connection to the connecting journals;

the connecting journals are connected to the front wheels;

the lower anchoring wishbones are connected to the connecting journals through a pivoting connection, which are suitable for being fixed to the front support and for supporting the weight of the front wheels.

A vehicle comprising a chassis like that of the invention, which can describe curves by inclining the wheels in a stable and safe manner, but keeping the loading bed and the cargo horizontal at all times, since the front suspension and inclination assembly allows the stiffening bridge to be inclined independently of the loading bed, is thereby achieved. Furthermore, providing a chassis for use in an electric vehicle, making the driving thereof safe, and capable of circulating with the flexibility of a motorcycle and with much larger cargo capacities than a conventional delivery motorcycle, is thereby achieved.

Another object of the present invention relates to an electric vehicle comprising a chassis according to any of the embodiments described herein.

In a preferred embodiment of the invention, the electric vehicle comprises a cargo casing arranged on the loading bed. Protecting the cargo from bad weather or from possible crashes or collisions is thereby achieved.

In a preferred embodiment of the invention, the electric vehicle comprises an electronic module, said electronic module being configured for managing the energy consumption of the vehicle and the batteries housed in the battery housings. Preferably, the electronic module is arranged on the loading bed.

In a preferred embodiment of the invention, the electric vehicle comprises a handlebar and a seat for a driver in the rear part of the vehicle. Contributing to freeing up space in the central area for housing the cargo or goods is thereby achieved. This distribution of the elements in the chassis and in the vehicle, by housing the driver's seat in the rear part of the vehicle, allows the cargo capacity in relation to weight and volume to be increased.

In a preferred embodiment of the invention, the electric vehicle comprises one or more additional seats for passengers in front of the seat for the driver. Providing a lightweight and stable electric vehicle for transporting passengers which furthermore does not block the view of passengers since the driver is located in the rear part of the vehicle, is thereby achieved.

In a preferred embodiment of the invention, the electric vehicle has a maximum width comprised between 80 and 100 cm. Providing a lightweight vehicle with a cargo capacity greater than that of conventional motorcycles, which is furthermore capable of circulating in an urban area in a flexible manner that is easy to park, is thereby achieved. Furthermore, providing a homologated electric vehicle for parking in an area designated for motorcycles without jeopardizing the stability thereof is achieved as a result of its dimensions and its novel chassis comprising the traction and steering assembly and the suspension and inclination assembly.

In a preferred embodiment of the invention, the electric vehicle comprises a trailer. Being able to even further increase the cargo transported by the vehicle is thereby achieved.

In a preferred embodiment of the invention, the electric vehicle comprises a windshield for the driver of the vehicle. Preferably, the electric vehicle furthermore comprises a canopy. Protecting the driver from bad weather is thereby achieved in a lightweight and narrow vehicle.

In a preferred embodiment of the invention, the electric vehicle comprises one, two, or more rear wheels. Increasing the stability of the vehicle with more rear wheels is thereby achieved.

In a preferred embodiment of the invention in which the electric vehicle comprises a handlebar, the vehicle further comprises an electronic controller in the handlebar and a cable connection from the handlebar to the rear traction and steering assembly for transmitting running orders to the latter.

In a preferred embodiment of the invention in which the electric vehicle comprises a cargo casing, between said cargo casing and the loading bed there is a cargo space that has dimensions comprised between 1.0-1.3 m high, 0.8-1.0 m wide, and 0.8-1.0 m long. Not blocking the driver's visibility during the trip is thereby achieved. Additionally, covering the driver and protecting him or her from the resistance put up by the wind by placing the cargo casing between said driver and the wind while running, as if it were a vehicle body, is thereby achieved.

The invention thereby allows proposing a solution for an electric vehicle comprising a chassis with a planar loading bed, which is particularly suitable for use in:

Licensed vehicles intended for transporting goods and requiring a cargo capacity of more than 200 liters, but which due to its dimensions and homologation as an L5E motorcycle, may access and park in areas intended for motorcycles, transporting the same cargo as a commercial van, without causing holdups or jams.

Licensed vehicles intended for transporting people and usually having two front seats, plus the seat for the driver in the rear area, thereby facilitating better visibility of the passengers as the driver is not in front of them.

Vehicles intended for public services, such as urban cleaning, garbage collection, maintenance, firefighters, ambulances, civil protection, police, etc., which require vehicles with a large box (euro-pallet) that can be customized to its technical needs, a cargo capacity of 750 kg, and especially dimensions (90 cm wide) and a flexibility that allows them to provide services in hard-to-access areas and streets.

Vehicles intended for cargos in enclosed spaces, industrial buildings, or warehouses, covering internal cargo movement needs in a more flexible and faster manner than with conventional pallet jacks or fenwicks.

REFERENCE NUMBERS USED IN THE FIGURES

Figure 1:
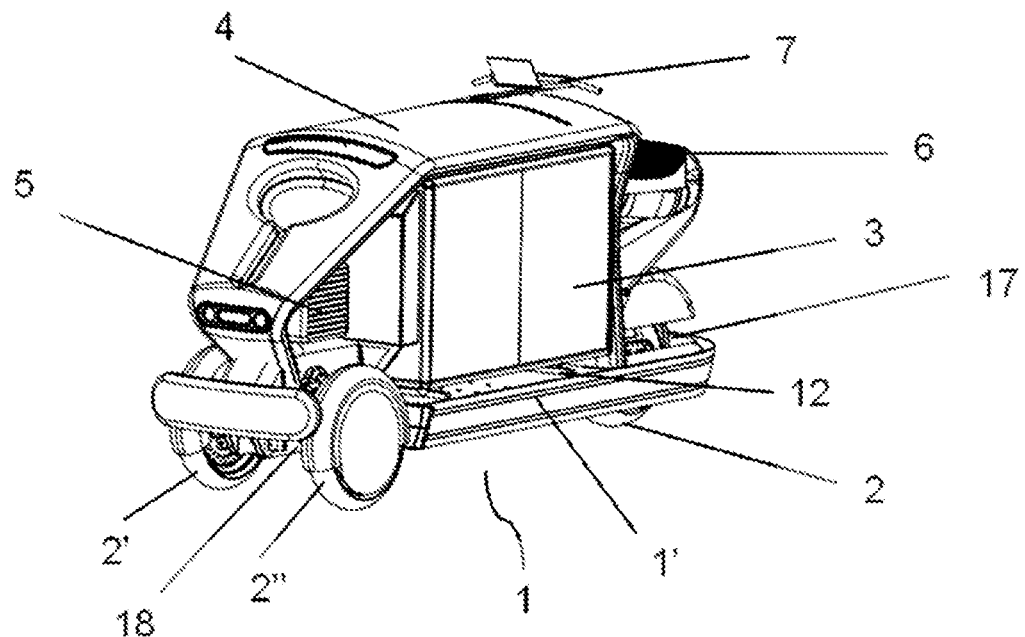
FIG. 1 shows a perspective view of an electric vehicle intended for cargo comprising the chassis of the invention according to a preferred embodiment thereof.
Figure 2:
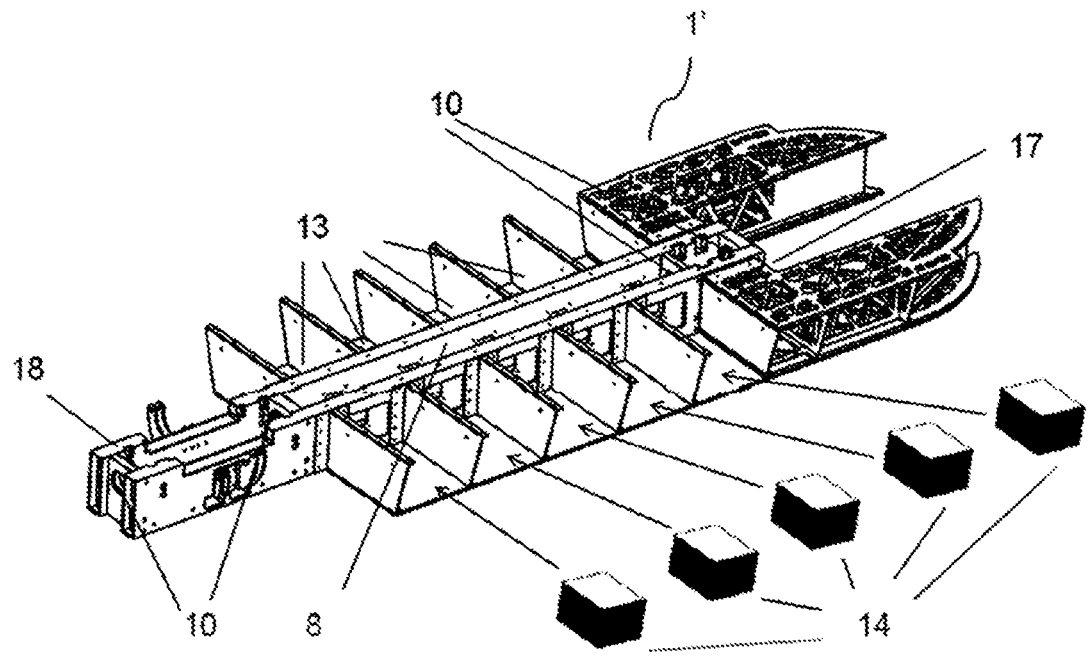
FIG. 2 shows an interior perspective view of the loading bed of the chassis of the invention according to a preferred embodiment of the invention.

For the purpose of helping to better understand the technical features of the invention, the mentioned FIGS. 1-5 are accompanied by a series of reference numbers in which the following is depicted in an illustrative and non-limiting manner:

| | |
|---|---|
| (1) | Chassis |
| (1') | Loading bed |
| (2) | Rear wheel |
| (2', 2") | Front wheels |
| (3) | Cargo box |
| (4) | Cargo casing |
| (5) | Electronic module |
| (6) | Seat |
| (7) | Handlebar |
| (8) | Housing channel |
| (9) | Central shaft |
| (10) | Holes |
| (11) | Bearings |
| (12) | Extraction rails |
| (13) | Housings for batteries |
| (14) | Batteries |
| (15) | Rear traction and steering assembly |
| (16) | Front suspension assembly |
| (17) | Rear opening |
| (18) | Front support |
| (19) | Upper suspension wishbones |
| (20) | Lower anchoring wishbones |
| (21) | Connecting journals |
| (22) | Stiffening bridge |
| (23) | Secondary shaft |

DETAILED DESCRIPTION OF THE INVENTION

A preferred embodiment of the present invention provided for purposes of illustrating but not limiting same is described below.

As described in the preceding sections and as depicted in FIGS. 1-5 herein, an object of the present invention relates to an electric vehicle intended for the urban delivery of goods and/or transport of people, comprising:

a chassis (1), suitable for housing and bringing together all the suspension, steering, and traction elements of the vehicle and configured for supporting the main weight of the vehicle and the goods;

one rear wheel (2) and two front wheels (2', 2") connected to the chassis (1);

a cargo box (3) arranged on the chassis (1) suitable for containing therein the transported goods;

a cargo casing (4), suitable for receiving the cargo box (3);

an electronic module (5), suitable for managing the energy consumption of the electric vehicle;

a seat (6) for the driver; and a handlebar (7) for handling and controlling the steering of the vehicle.

An electric vehicle with these elements according to a preferred embodiment of the invention can be observed in FIG. 1. The vehicle is conceived for being driven from the rear part thereof. The chassis (1) comprises a substantially planar loading bed (1'), arranged horizontally between the three wheels (2, 2', 2"), and is suitable for holding the cargo box (3) thereon, preferably in the central area of the vehicle. More preferably, the cargo box (3) has a height and dimensions such that the visibility of the driver is not blocked.

More specifically, the loading bed (1') comprises a housing channel (8) running through it longitudinally, suitable for receiving a central shaft (9) comprised in the chassis (1). (The channel (8) can be seen in FIG. 2, whereas the central shaft (5) can be observed in FIG. 5). The loading bed (1') likewise comprises holes (10) housing connections for bearings (11) between the central shaft (9) and the channel (8) of the loading bed (1'). These bearings (11) allow the loading bed (1') to pivot freely around the central shaft (9).

The loading bed (1') comprises extraction rails (12), preferably arranged transverse to the central shaft (9), suitable for facilitating the extraction of the cargo box (3) from the side of the electric vehicle.

The loading bed (1') further comprises a plurality of housings (13) for a plurality of batteries (14) of the electric vehicle, the latter being distributed so that the batteries (14) are positioned in an even and symmetrical manner in relation to weight along and across the plane formed by the loading bed (1'). The distribution of the batteries (14) thereby contributes to the horizontal stabilization of the loading bed (1'), as it allows the distribution of the goods inside the cargo box (3) (which is located on top of the loading bed (1')) not to be such a decisive factor in determining the position of the center of gravity of the vehicle, even when the distribution of the cargo is not completely symmetrical to both sides of the central shaft (9). Additionally, the batteries (14) of electric vehicles are elements having considerable weight, which shifts the center of gravity to the ground, making the vehicle more stable than a conventional motorcycle. For example, ten housings (13), five on each side of the central shaft (9), can house extractable batteries (14) weighing 10 kg each, transferring 100 kg of batteries (14) to a lower area of the vehicle, thereby improving the dynamic behavior of the electric vehicle.

Moreover, as mentioned, the vehicle comprises three wheels (2, 2', 2") for the purpose of providing better stability during movement and being capable of transporting a larger cargo than what is transported in conventional motorcycles.

In addition to the above, the chassis (1) of the electric vehicle comprises two assemblies for stabilizing the vehicle: the rear traction and steering assembly (15) and the front suspension and inclination assembly (16). The rear traction and steering assembly (15) is responsible for steering the vehicle and driving it during movement. Preferably, this module is connected to the electronic module (5) and to the batteries (14) of the electric vehicle, for managing the movement and the steering of the vehicle. The front suspension and inclination assembly (16) has the function of keeping the vehicle stable, especially in curves.

Figure 3:
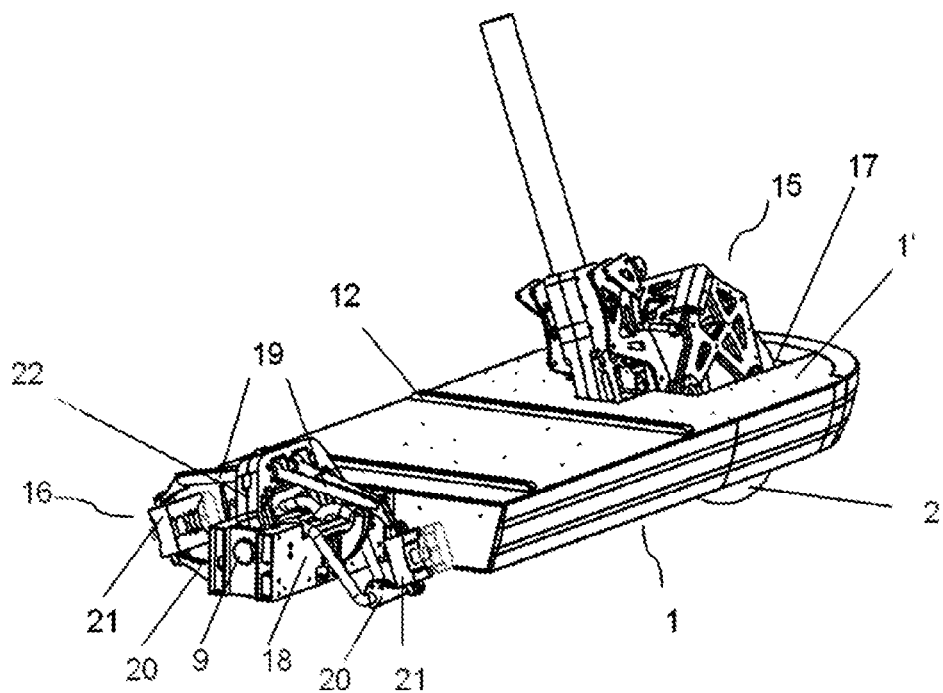
FIG. 3 shows an interior perspective view of an electric vehicle comprising the chassis of the invention when said vehicle takes a curve and is slightly inclined according to a preferred embodiment thereof.

For the correct stabilization of the vehicle comprising the chassis (1), both front and rear assemblies (15, 16) are attached by the central shaft (9) going through the loading bed (1'). The front assembly (16) is connected to the front wheels (2', 2") and the rear assembly (15) is connected to the rear wheel (2). Preferably, the loading bed (1') has a rear opening (17) for housing the rear assembly (15) and the rear wheel (2). Furthermore, the front assembly (16) is arranged in a front support (18) of the loading bed (1'), as shown in FIG. 3.

Figure 4:
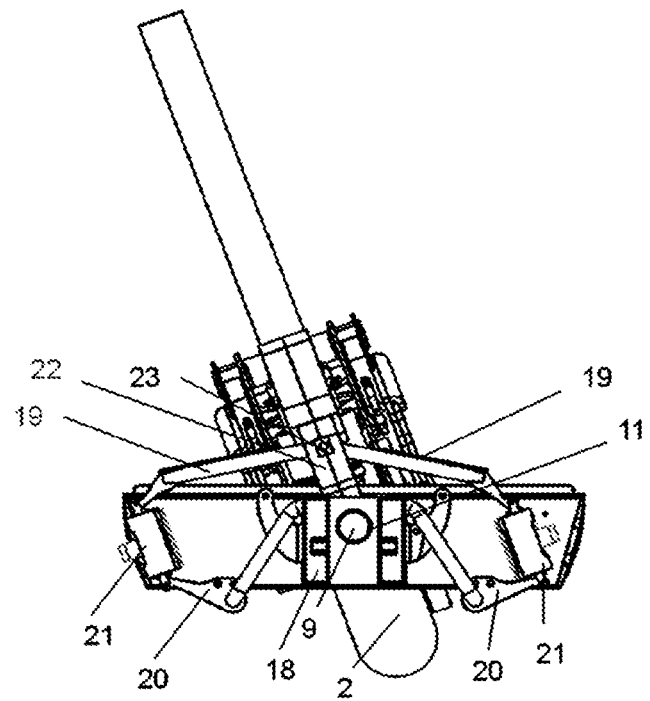
FIG. 4 shows an interior front view of the electric vehicle comprising the chassis of the invention according to a preferred embodiment thereof.
Figure 5:
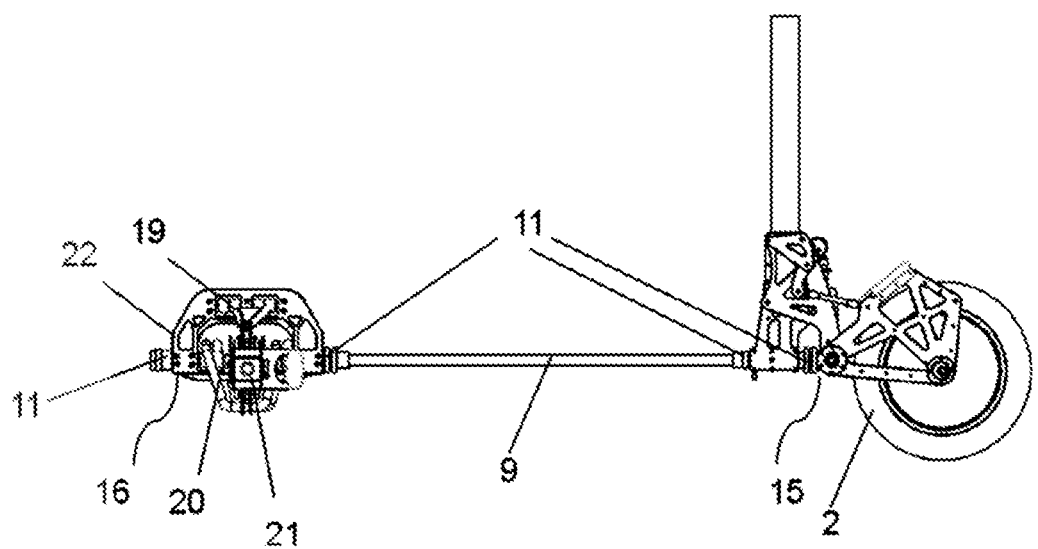
FIG. 5 shows an interior side view of an electric vehicle comprising the chassis of the invention according to a preferred embodiment thereof.

A detail of the front suspension and inclination assembly (16) is shown in FIG. 4. Said front assembly (16) comprises:
  upper suspension wishbones (19);
  lower anchoring wishbones (20);
  connecting journals (21);
  a stiffening bridge (22);
  a secondary shaft (23).

The stiffening bridge (22) is housed partially in the front support (18), integrally attached to the central shaft (9) of the chassis (1), whereas the front support (18) of the loading bed (1') pivots freely around the central shaft (9) through one of the bearings (11). The upper suspension wishbones (19) are connected to the stiffening bridge (22) through a pivoting connection around a secondary shaft (23). The upper suspension wishbones (19) are connected in an articulated manner through connecting journals (21) to the lower anchoring wishbones (20). The lower anchoring wishbones (20) are fixed to the front support (18) of the loading bed (1'), and the connecting journals (21) are connected to the front wheels (2', 2").

When the vehicle takes a curve, the driver moves into the curve as if it were a motorcycle; in that moment, the inclination is transmitted both to the front assembly (16) and to the rear assembly (15). The rear assembly (15) transmits the inclination to the rear wheel (2) since the shaft of the rear wheel (2) is integral with said rear assembly (15) and also transmits the inclination to the front assembly (16) since both assemblies are attached by means of the central shaft (9). Since the inclination is transmitted to the front assembly (16), the stiffening bridge (22) is immediately inclined. Since the stiffening bridge (22) and the upper wishbones (19) have a pivoting connection, the upper wishbones (19) pivot around the secondary shaft (23), causing said inclination to be transmitted in turn to the connecting journals (21) (and from them to the front wheels (2', 2")), since their shafts are integral with the connecting journals (21)), but keeping said inclination isolated to the lower anchoring wishbones (20) and to the front support (18) of the loading bed (1'). Therefore, the function of the stiffening bridge (22) is to be inclined in the curve and to transmit the inclination in a parallel manner to the front wheels (2', 2"), but keeping the loading bed (1') horizontal. This novel design keeps the vehicle stable in the path of curves. Therefore, when describing a curve, the vehicle is inclined but the loading bed (1') pivots around the central shaft (9) by means of the support on the e.g. needle or ball bearings (11) anchored to the chassis (1), with there being no rigid connection between both and allowing a free rotation. The loading bed (1') is thus isolated from the inclinations of the vehicle at all times. That is a tremendous advantage, since the vehicle is stable on curves whereas the cargo remains horizontal.

Therefore, this distribution and novel technical elements combine in one and the same electric vehicle the inclination capacities of motorcycles or three-wheeled cycles with the cargo properties of a substantially planar chassis (1) closer to the conventional chassis of a truck.

The fundamental advantage of the vehicle of the invention resides in the inclination capacity of the vehicle to facilitate describing curves, while keeping the cargo horizontal relative to the ground, bringing together the best aspects of automobiles (stability, safety, cargo capacity, etc.) with the best aspects of motorcycles (flexible in the city center, narrower and more accessible, more moderate consumption, etc.).

As can be observed in FIG. 3, the chassis (1) of the electric vehicle additionally has the functionality of providing structure stiffness to the vehicle due to its distribution and design, surpassing the stiffness and stability of a conventional motorcycle.

Another one of the main advantages of the electric vehicle of the invention resides in the distribution of the elements in the chassis (1) in the vehicle. The distribution of these elements optimizes the use of space and the stability of the vehicle, while it increases cargo capacity and volume, without the need to provide a vehicle that is as wide as an urban delivery car or van to that end. In this sense, the electric vehicle of the invention can be homologated and can park in parking spots intended for motorcycles, while at the same time being narrow enough so as to circulate on narrow streets and more inaccessible places for vehicles of another type. In addition, the electric vehicle of the invention is a clean vehicle and its $CO_2$ footprint is inexistent.

That is, the planar design of the loading bed (1') and of the chassis (1) allows the cargo space for cargo that can be transported in a narrow and lightweight electric vehicle less than 90 cm wide to be optimized, being able to transport volumes for the cargo box (3) in the order of 200 l. Preferably, the cargo box (3) has substantial dimensions of 1.2×0.9×0.9 m.

Moreover, the distribution of the cargo and of the elements in the chassis (1) allows the cargo to be in the order of 200-750 kg, maintaining the necessary stability and homologation for circulating and parking in parking spots intended for conventional motorcycles.

The invention claimed is:

1. A chassis, suitable for use in electric vehicles having at least three wheels intended for cargo and/or people, characterized in that said chassis comprises:
   a substantially planar loading bed, suitable for receiving a load on top of same, which is located substantially in the space existing between at least two front wheels and at least one rear wheel of an electric vehicle;
   wherein said loading bed comprises a housing channel located substantially along said loading bed;
   wherein the chassis also comprises a central shaft housed in the housing channel;
   wherein the loading bed is connected so as to pivot relative to said central shaft;
   wherein the loading bed comprises a plurality of battery housings, being distributed in a manner substantially symmetrical to both sides along the central shaft;
   wherein the chassis further comprises a rear traction and steering assembly and a front suspension and inclination assembly; both assemblies being connected through the central shaft; and
   wherein the rear traction and steering assembly and the front suspension and inclination assembly respectively comprise connections to the at least one rear wheel and to the at least two front wheels.

2. The chassis according to the claim 1, wherein the loading bed comprises extraction rails, configured for the extraction of a cargo box housed on the loading bed.

3. The chassis according to claim 2, wherein the extraction rails are located in a manner that is substantially horizontal and perpendicular to the central shaft, configured for the extraction of the cargo box from the side of the loading bed.

4. The chassis according to claim 1, further comprising:
   a front support of the loading bed; and
   a rear opening of the loading bed;
   wherein the rear traction and steering assembly and the front suspension and inclination assembly are arranged respectively and partially in the rear opening and in the front support of the loading bed.

5. The chassis according to the claim 4, wherein the front suspension and inclination assembly comprises a stiffening bridge, connecting journals, upper suspension wishbones and lower anchoring wishbones; wherein:
   the stiffening bridge is integrally attached to the central shaft and is partially arranged in the front support of the loading bed;
   the front support of the loading bed pivots freely around the central shaft;
   the stiffening bridge is connected through a pivoting connection to the upper suspension wishbones;
   the upper suspension wishbones are connected through a pivoting connection to the connecting journals;
   the connecting journals are connected to the front wheels;
   the lower anchoring wishbones are connected to the connecting journals through a pivoting connection, which are suitable for being fixed to the front support and for supporting the weight of the front wheels.

6. An electric vehicle comprising a chassis according to claim 1.

7. The electric vehicle according to the claim 6, further comprising a cargo casing arranged on the loading bed.

8. The electric vehicle according to claim 7, wherein between the cargo casing and the loading bed there is a cargo space that has dimensions comprised between 1.0-1.3 m high, 0.8-1.0 m wide, and 0.8-1.0 m long.

9. The electric vehicle according to claim 6, further comprising an electronic module, said electronic module being configured for managing the batteries housed in the battering housings.

10. The electric vehicle according to claim 6, the maximum width of which is comprised between 80 and 100 cm.

11. The electric vehicle according to claim 6, further comprising a handlebar and a seat for a driver in the rear part of the vehicle.

12. The electric vehicle according to claim 11, further comprising an electronic controller in the handlebar for transmitting running orders to the rear traction and steering assembly.

* * * * *